United States Patent
Lin et al.

(10) Patent No.: US 9,537,786 B2
(45) Date of Patent: Jan. 3, 2017

(54) METHOD, DEVICE, AND SYSTEM FOR INFORMATION PROCESSING BASED ON DISTRIBUTED BUSES

(71) Applicant: Tencent Technology (Shenzhen) Company Limited, Shenzhen (CN)

(72) Inventors: Aimin Lin, Shenzhen (CN); Qian Zhang, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 298 days.

(21) Appl. No.: 14/263,960

(22) Filed: Apr. 28, 2014

(65) Prior Publication Data

US 2014/0233584 A1    Aug. 21, 2014

Related U.S. Application Data

(63) Continuation of application No. PCT/CN2013/087833, filed on Nov. 26, 2013.

(30) Foreign Application Priority Data

Nov. 29, 2012  (CN) .......................... 2012 1 0499433

(51) Int. Cl.
  *H04L 12/873* (2013.01)
  *G06F 9/54* (2006.01)

(52) U.S. Cl.
  CPC ............. *H04L 47/522* (2013.01); *G06F 9/547* (2013.01); *G06F 2209/548* (2013.01)

(58) Field of Classification Search
  CPC ...... H04L 47/522; H04L 47/50; H04L 47/629; H04L 49/20; H04L 49/50; H04L 49/90
  See application file for complete search history.

(56) References Cited

U.S. PATENT DOCUMENTS 5,329,619 A * 7/1994 Page ..................... G06F 9/546
                                                                 707/999.104
6,477,586 B1 * 11/2002 Achenson ............. G06F 9/546
                                                                 718/100

(Continued)

FOREIGN PATENT DOCUMENTS

CN       102025649 A       4/2011
CN       102193779 A       9/2011

(Continued)

OTHER PUBLICATIONS

Tencent Technology. ISRWO, PCT/CN2013/087833, Feb. 27, 2014, 7 pgs.

(Continued)

*Primary Examiner* — Gary Mui
*Assistant Examiner* — Stephen Steiner
(74) *Attorney, Agent, or Firm* — Morgan, Lewis & Bockius LLP

(57) ABSTRACT

The present application discloses methods, devices, and systems for information processing based on distributed buses. A server may receive processing request packets from one or more client terminals and enter the processing request packets into a single input information queue. After determining a number of idle information processing threads, the server may use the idle information processing threads to process the selected processing request packets to obtain response data packets. Each information processing thread is configured to use a respective output information queue to store response data packets generated by the information processing thread. The server may then transmit the response data packets within a respective output information queue to a corresponding client terminal. The current method, as well as the devices and systems associated with the method, may be used to facilitate information processing, improve efficiency, and prevent excessive burden and data loss.

20 Claims, 6 Drawing Sheets

(56) References Cited

U.S. PATENT DOCUMENTS

2006/0045021 A1* 3/2006 Deragon ................ H04L 1/243
370/249
2006/0167883 A1* 7/2006 Boukobza ......... G06F 17/30557

FOREIGN PATENT DOCUMENTS

| CN | 102387206 A | 3/2012 |
| CN | 102591721 A | 7/2012 |

OTHER PUBLICATIONS

Tencent Technology. IPRP, PCT/CN2013/087833, Jun. 2, 2015, 5 pgs.

* cited by examiner

METHOD, DEVICE, AND SYSTEM FOR INFORMATION PROCESSING BASED ON DISTRIBUTED BUSES

RELATED APPLICATIONS

This application is a continuation application of PCT Patent Application No. PCT/CN2013/087833, entitled "METHOD, DEVICE, AND SYSTEM FOR INFORMATION PROCESSING BASED ON DISTRIBUTED BUSES" filed Nov. 26, 2013, which claims priority to Chinese Patent Application No. 201210499433.7, "Method, Device, and System for Information Processing based on Distributed Buses," filed Nov. 29, 2012, both of which are hereby incorporated by reference in their entirety.

FIELD OF THE INVENTION

The present application relates to the field of data processing, and in particular to methods, devices, and systems for information processing based on distributed buses.

BACKGROUND OF THE INVENTION

With the process of network technologies, more and more network applications have been developed. In the network applications, the client terminals usually send service requests to a remote server through a Remote Procedure Call Protocol (RPC).

The RPC is a protocol for requesting a remote computer program for a service through a network. The process of requesting service through the RPC by a client terminal generally includes the following steps: after the client terminal establishes a connection with the server, the client terminal calls an RPC interface function to send processing request information carrying process parameters to the server; the client terminal waits for an response message; the server, after receiving the processing request information through a corresponding server interface function, obtains the process parameters from the processing request information; the server then calls a process to execute an operation and returns the operation result as an response message to the client terminal, thereby finishing the communication.

During the implementation of the present application, the inventors find that the existing technology at least has the following problems:

The server usually starts to process the request information immediately upon receiving the request. When an enormous number of users are accessing the server, the data that require processing become excessive compared to the limited capability of the server. Such an approach increases the burden on the server, reduces the work capability of the system, and at the mean time causes possible loss of request information.

Accordingly, it is necessary and desirable to provide a new technology, so as to resolve the technical problem and improve the above-mentioned approach.

SUMMARY

The above deficiencies and other problems associated with information processing are reduced or eliminated by the present application disclosed below. In some embodiments, the present application is implemented in a computer system, e.g., a server, that has one or more processors, memory and one or more modules, programs or sets of instructions stored in the memory for performing multiple functions. Instructions for performing these functions may be included in a computer program product configured for execution by one or more processors.

One aspect of the present application involves a computer-implemented method performed by a computer system. The computer system may receive processing request packets from one or more client terminals and enter the processing request packets into a single input information queue. After determining a number of idle information processing threads, the computer system may select, from the front of the input information queue, a number of processing request packets that is equal to the number of idle information processing threads and use the idle information processing threads to process the selected processing request packets to obtain response data packets. In addition, each information processing thread is configured to use a respective output information queue to store response data packets generated by the information processing thread. The computer system may then transmit the response data packets within a respective output information queue to a corresponding client terminal.

Another aspect of the present application involves a computer system. The computer system may comprise one or more processors, memory, and one or more program modules stored in the memory and configured for execution by the one or more processors, the one or more program modules including: a receiving module configured to receive processing request packets from one or more client terminals and enter the processing request packets into a single input information queue; a processing module configured to: determine a number of idle information processing threads, select, from the front of the input information queue, a number of processing request packets that is equal to the number of idle information processing threads, and use the idle information processing threads to process the selected processing request packets to obtain response data packets, wherein each information processing thread is configured to use a respective output information queue to store response data packets generated by the information processing thread; and a transferring module configured to transmit the response data packets within a respective output information queue to a corresponding client terminal.

Another aspect of the present application involves a non-transitory computer readable storage medium having stored therein instructions, which, when executed by a computer system, cause the computer system to: receive processing request packets from one or more client terminals and enter the processing request packets into a single input information queue; determine a number of idle information processing threads; select, from the front of the input information queue, a number of processing request packets that is equal to the number of idle information processing threads; use the idle information processing threads to process the selected processing request packets to obtain response data packets, wherein each information processing thread is configured to use a respective output information queue to store response data packets generated by the information processing thread; and transmit the response data packets within a respective output information queue to a corresponding client terminal.

Some embodiments may be implemented on one or more computer devices in a network environment.

BRIEF DESCRIPTION OF THE DRAWINGS

The aforementioned features and advantages of the present application as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

To better understand the embodiments herein described, basic architecture of a distributed bus system is first illustrated in brief. The distributed bus system includes multiple distributed buses and multiple network nodes connected through the distributed buses, the network nodes can implement interactions with one another with massages and information transmission through the distributed buses, and the network nodes are generally servers.

EXAMPLE 1

Figure 1:
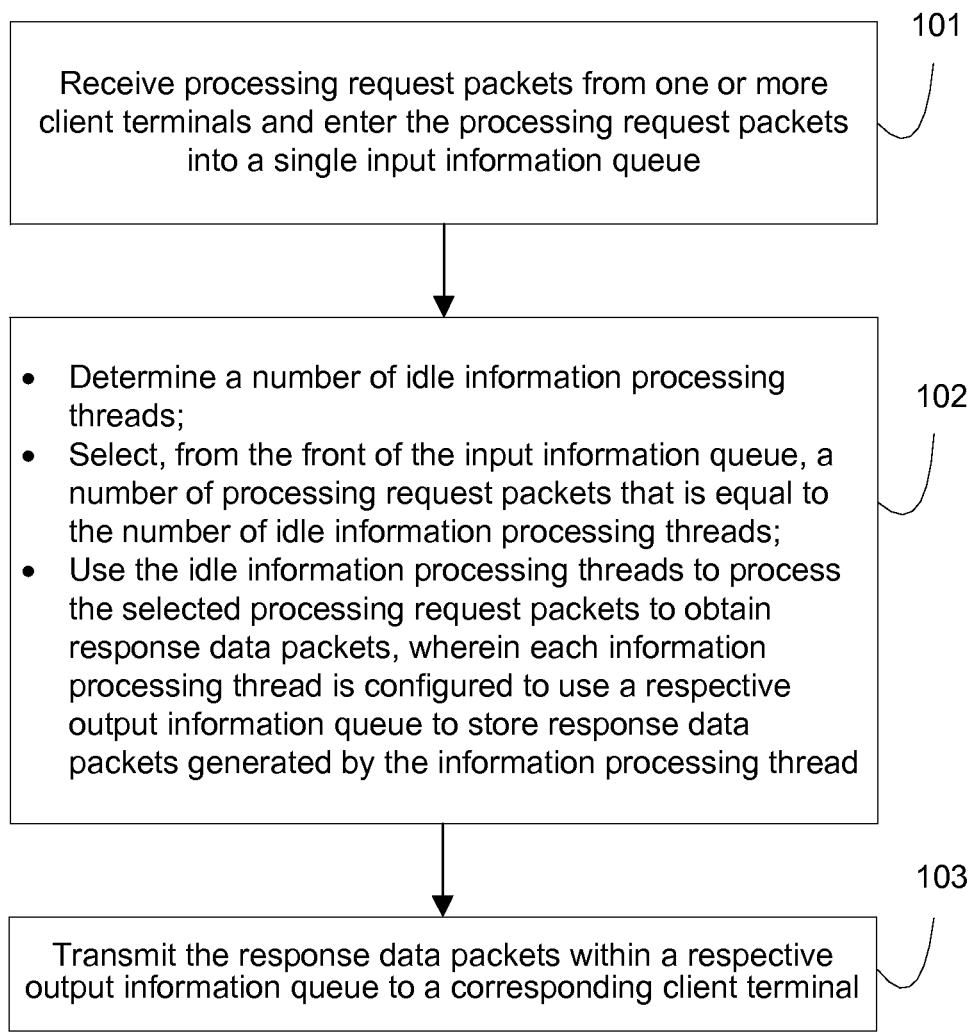
FIG. 1 is a flowchart illustrative of an information processing method in accordance with some embodiments of the present application.

FIG. 1 is a flowchart illustrative of an information processing method in accordance with some embodiments of the present application. As indicated in step 101 of FIG. 1, a computer system, e.g. a server, may receive processing request packets from one or more client terminals and enter the processing request packets into a single input information queue.

The computer system may be any computing device that has networking and data processing capabilities, such as but not limited to servers, workstations, personal computer such as desktops and laptops, and mobile devices. Here a server may be used as an example for the computer system. The client terminal may serve as examples for any kind of computing devices such as but not limited to personal computers (PC), smart phones (e.g. Android® or IOS® phones), tablet computers, personal digital assistants (PDAs), and other mobile internet devices (MID).

Application programs installed on the server and the client terminals may necessitate the processing of information by the server. In some embodiments, the client terminals may generate a request before sending the request that includes the information to be processed to the server; the server may then process the requests and send back responses to the client terminals. In some embodiments, the requests are transmitted in the form of processing request packets, which are a collection of information items that are packaged and transferred according to pre-determined protocols so that the server may receive the processing request packets and manage the processing of these packets.

In some embodiments, for each server, there is a single input information queue that may be used to manage and align the processing request packets. In some embodiments, the input information queue may have a ranking structure, wherein the processing request packets are ranked according to parameters such as but limited to the time point a processing request packet is entered, the size of the processing request packets, the important of a processing request packets according to a predefined scale. In some embodiments, the processing request packets are ranked according to the time of entering, making it a first come, first process system. The input information queue may be viewed as a linear structure that allows ordered processing of the requests.

As indicated in step 102 of FIG. 1, the server may determine a number of idle information processing threads, select, from the front of the input information queue, a number of processing request packets that is equal to the number of idle information processing threads, and use the idle information processing threads to process the selected processing request packets to obtain response data packets. In some embodiments, each information processing thread is configured to use a respective output information queue to store response data packets generated by the information processing thread.

At a particular moment, there may be a number of information processing threads in the processing thread pool that are idle—not being used to process processing request packets. The server may identify these idle information processing threads and assign the same number of processing request packets, which are aligned from the front of the input information queue, to the idle information processing threads. The server may then use the idle information processing threads to process the processing request packets to generate the response data packets, wherein the response data packets are stored in output information queues. In some embodiments, each information processing threads has only one respective output information queue so that the response data packets from the same information processing thread are lined up in the same output information queue. The response data packets may be ranked in the output information queue by the time of entering or other parameters.

When there is no idle information processing threads, the server will not use the information processing threads to process any processing request packets. The number of new processing request packets that may be processed depends on the number of idle information processing threads. Such an approach prevents the over-burdening and over-working of the server and the information processing threads, reducing the risk of data loss, and improving overall efficiency.

As shown in step 103 of FIG. 1, the server may transmit the response data packets within a respective output information queue to a corresponding client terminal. Since in some embodiment the processing request packets include the identification information of the client terminal that sends the request, a corresponding relationship may be established between the response data packets and the client terminal. Therefore, the response data packets in the output information queue may be transmitted directly back to the corresponding client terminal. The transmission may be carried out from the output information queue directly or from a intermediate storage mechanism between the output information queue and the client terminal.

EXAMPLE 2

Figure 2:
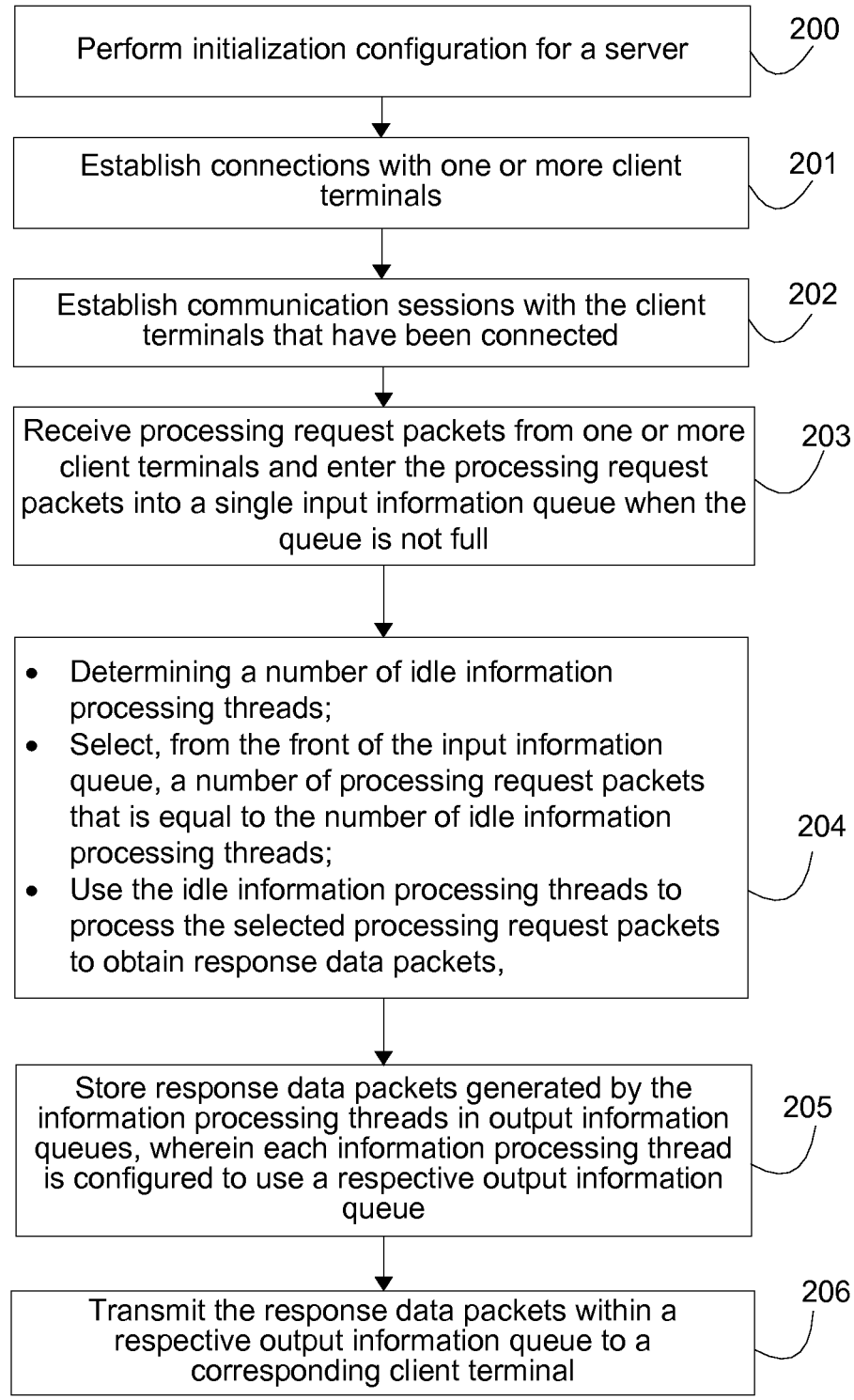
FIG. 2 is a flowchart illustrative of an information processing method in accordance with some embodiments of the present application, providing more details.

FIG. 2 is a flowchart illustrative of an information processing method in accordance with some embodiments of the present application, providing more details.

Step 200 of FIG. 2 shows that the user of the server may perform initialization configuration of the server. In particular, the specific subjects of configuration may include but not be limited to: server mode, server name, server ip address, maximum number of connections, maximum number of communication sessions, input information queue identifier, input information queue size, the size of the information processing thread pool, output information queue identifier, and/or the size of the output information queue size.

The server mode may include a local mode and a network mode, which are corresponding to client types. A client accessing a server in a local mode is a local process, and a client accessing a server in a network mode is a non-local process. Particularly, in some embodiments, in the local mode, an IP address of the server may be 127.0.0.1.

The maximum number of connections may refer to a maximum number of connections that can be established simultaneously between the server and the client terminals. When the number of connections established simultaneously between the server and the client terminals reaches the maximum number of connections, a new connection cannot be established.

The maximum number of communication sessions may refer to a maximum number of communication sessions that can be performed simultaneously between the server and the client terminals, wherein each communication session carries a continuous exchange of information between the server and a client terminal. When the number of simultaneous communication sessions that have been established reaches the maximum number of communication sessions, a client terminal requesting a new communication session cannot be directly granted but may be entered into a communication session queue.

It should be noted that step 201 may be performed according to manual configuration information, and may be used as a default configuration of the server. In addition, in some embodiments, step 201 is optional.

Step 201 of FIG. 2 shows that the server may establish connection to the one or more client terminals. In some embodiments, the server may mark the client terminals as connected or change the status of the client terminal to being connected.

Specifically, the step may include: the server receives a request for establishing a connection based on a Transmission Control Protocol (TCP) or a User Datagram Protocol (UDP) that is initiated by the one or more client terminals; when the server has additional connecting capacity, the server establishes connections with the client terminals.

After the connection is established, the client terminal and the server may keep the connection through periodically transmitting monitoring data packets, and when a monitoring data packet sent by the client terminal is not received in a period of time, the connection with the client terminal may have been dislodged.

The client terminal may use the local process or the non-local process. If the client terminal is a non-local process device, the information may be transmitted through a bus between the server and the client terminal.

Step 202 of FIG. 2 shows that the server may establish communication sessions with the client terminals that have been connected, so that the server may receive the processing request packets from the client terminals.

In some embodiments, the processing request packets are based on binary communication protocols. In some embodiments, a format of the header of the processing request packets may include the parameters in Table 1.

TABLE 1

| len | chksum | encrypt + compress | uin | cmd | seqno | body | sockid | srcip |
|---|---|---|---|---|---|---|---|---|

In Table 1, "len" represent a packet length; "checksum" represents checksum—a form of verification subjects; "encrypt+compress" represents encryption and compression; "uin" represents a unique identifier of the client; "cmd" represents a command word, each type of command work representing a server requested by the client; "seqno" represents a sequence number of the request data packet, and is used to identify an order of data packets sent by the client; body represents a header body, which is corresponding to a cmd type, which represents the service requested by the client and data requiring being processed by the service; "sockid" represents a connection state identifier; and "scrip" represents a resource IP address, which is an ip address of the client terminal.

The following Table 2 further defines the parameters.

TABLE 2

| Field | Type | Illustration |
|---|---|---|
| len | int (32) | A packet length |
| checksum | short (16) | A checksum |
| encrypt + compress | char (8) | Encryption and compression |
| uin | int (32) | A unique identifier of a client |
| cmd | short (16) | A command word |
| seqno | short (16) | A sequence number of a request data packet |
| body | elongated | A header body |
| sockid | short (16) | A connection state identifier |
| srcip | int (32) | A source IP address |

In general, the embodiments of the present application may adopt the binary based lightweight information protocol, thereby reducing link overhead and processing consumption.

Figure 3:
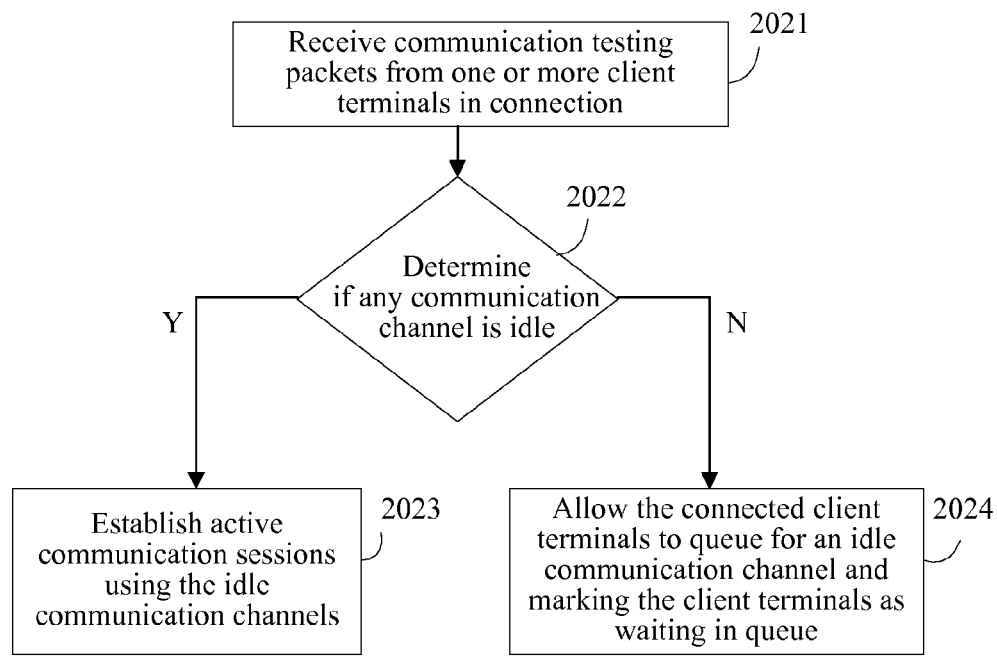
FIG. 3 is a flowchart illustrative of steps in an information processing method to select idle communication channels and establish communication sessions in accordance with some embodiments of the present application.

Step 202 of FIG. 2 is further elaborated in FIG. 3, which is a flowchart illustrative of steps in an information processing method to select idle communication channels and establish communication sessions in accordance with some embodiments of the present application As indicated in step 2021 of FIG. 3, the server may receive communication testing packets from one or more client terminals that are in connection with the server. After the server has established connection with the client terminal, the client terminal may request setting up the communication session with the server by sending communication testing packets, which may trigger the step of 2022, as shown in FIG. 3.

The server may determine if any communication channel is idle. In some embodiments, communication channels may refer to the communication capacity of the server that may be used to establish communication sessions. In some embodiments, communication channels may reflect the processing and networking capacity of the server. In step 2022 of FIG. 3, the server may determine if there is any idle capacity that is not used for communication sessions between the server and the client terminals.

If there are idle communication channels, as indicated in step 2023 of FIG. 3, the server may establish active communication sessions using the idle communication channels.

On the other hand, if there is no idle communication channel, as indicated in step 2024 of FIG. 3, the server may allow the connected client terminals to queue for an idle communication channel and marking the client terminals as waiting in queue. When any communication channels become available, the client terminals positioned at the front of the queue may have the priority to use the idle communication channel to establish communication sessions with the server.

In addition, when a client terminal in communication is disconnected abnormally, the server may switch the communication channel with the abnormally disconnected client terminal to a protected status, which means that the client terminal has been disconnected abnormally. Abnormal disconnection may result from network or hardware malfunction, loss of power, or other reasons that are not the intention of the users. When the communication is disconnected abnormally, the protected communication channel is not automatically assigned to the next client terminal in the queue.

In some embodiments, before searching for an idle communication channel, the server may determine if any connected client terminal is associated with a communication channel having a protected status. If a connected client terminal is associated with a communication channel having a protected status, the server may establish the communication session with the client terminal using the communication channel. In some embodiments, the server may establish the communication session with the client terminal using any additional communication capacity the server has.

In some embodiments, the client terminal may get abnormally disconnected and then become connected again. Therefore, in some embodiments, after receiving a communication request from a connected client terminal, the server may determine whether the client terminal has an old communication session that is associated with an old connection; and if the client terminal has an old communication session associated with an old connection, the server may terminate the old connection associated, establish a new communication session, and associate the new communication session with the new connection.

The steps as described above provide more guidance as to how the connections and communication sessions may be established. Such an approach may make the connections for large number of client terminals more orderly, improving the system's efficiency, manageability, and maintenance.

Step 203 of FIG. 2 shows that the server may receive processing request packets from one or more client terminals and enter the processing request packets into a single input information queue when the queue is not full. In some embodiments, the processing request packets are written into the input information queue. When the input information queue is full, the server does not write the processing request packets into the input information queue. In some embodiments, the processing request packets that cannot be entered may be discarded.

The size of the input information queue may be determined by a number of factors such as but not limited to the number of client terminals that may be connected to the server, the processor speed of the server, the memory size of the server, the quality and speed of the network, and/or any combination thereof. It is preferable to avoid having an input information queue that is too small to allow processing request packets to be written into the input information queue because that may result in loss of information. In some embodiments, any data size that is smaller than the empty portion of the input information queue may be entered into the input information queue.

As indicated in step 204 of FIG. 2, the server may determine a number of idle information processing threads, select, from the front of the input information queue, a number of processing request packets that is equal to the number of idle information processing threads, and use the idle information processing threads to process the selected processing request packets to obtain response data packets. In some embodiments, each information processing thread is configured to use a respective output information queue to store response data packets generated by the information processing thread.

In particular, in some embodiments, the server may decapsulate a processing request packet according to binary communication protocols, so as to obtain a header of the packet. In addition, the server may extract the fields in the header, wherein the fields in the header may include: a packet length, a checksum, encryption and compression, a unique identifier of the client, a command word, a sequence number of the request data packet, a header body, a connection state identifier, and a source IP address. Finally, the server may provide corresponding service or response to the client terminal according to the command word field.

In some embodiments, when the processing request packets cannot be processed, e.g. due to the lack of available information processing threads to provide the service requested by the client terminal, the server may pass the processing request packets to another connected processing device (e.g. another server).

In some embodiments, after a processing request packet is selected from the input information queue to be processed, a new processing request packet may be written into the input information queue. It should be noted that in some embodiments, because the time to process data is usually greater than the time for reading and writing data, the input information queue is always full or close to full. Therefore, such a design enables the information processing to be more orderly, thereby reducing the burden on the information processing threads and improving the efficiency of data processing.

As shown in step 205 of FIG. 2, the server may store response data packets generated by the information processing threads in output information queues, wherein each information processing thread is configured to use a respective output information queue. Such an approach avoids the encrypting process that is sometimes necessitated by the design that multiple information processing threads may enter data into a output information queue. With step 205, since every information processing thread has its own output information queue, the encryption may not be needed in some embodiments.

Step 206 of FIG. 2 shows that the server may transmit the response data packets within a respective output information queue to a corresponding client terminal.

Examples 3-5 and the accompanying FIGS. 4-7 illustrate the computer system, e.g. server, that may be used to perform the methods described in FIGS. 1-3. To avoid redundancy, not all the details and variations described for the method are herein included for the computer system. Such details and variations should be considered included for the description of the devices as long as they are not in direct contradiction to the specific description provided for the methods.

EXAMPLE 3

Figure 4:
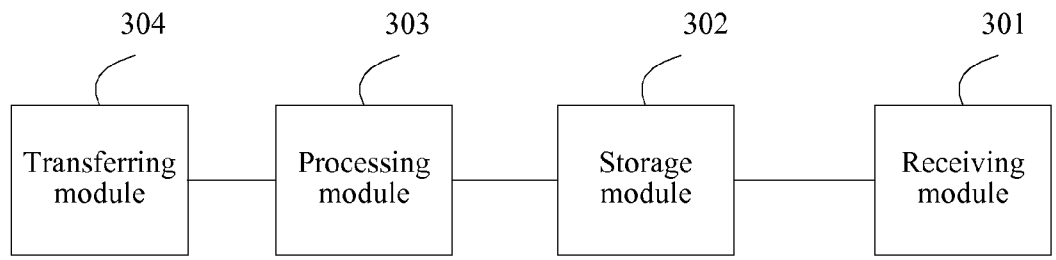
FIG. 4 is a block diagram illustrative of a computer system for information processing in accordance with some embodiments of the present application.

FIG. 4 is a block diagram illustrative of a computer system for information processing in accordance with some embodiments of the present application. Shown in FIG. 4 is a server having one or more processors; memory; and one or more program modules stored in the memory and configured for execution by the one or more processors. The one or more program modules may include: a receiving module 301, a processing module 303, and a transferring module 304.

The receiving module 301 may be configured to receive processing request packets from one or more client terminals and enter the processing request packets into a single input information queue.

The processing module 302 may be configured to: determine a number of idle information processing threads, select, from the front of the input information queue, a number of processing request packets that is equal to the number of idle information processing threads, and use the idle information processing threads to process the selected processing request packets to obtain response data packets, wherein each information processing thread is configured to use a respective output information queue to store response data packets generated by the information processing thread.

The transferring module 304 may be configured to transmit the response data packets within a respective output information queue to a corresponding client terminal.

In addition, in some embodiments, the server may further comprise a storage module 302, which may be configured to store the input information queue.

EXAMPLE 4

Figure 5:
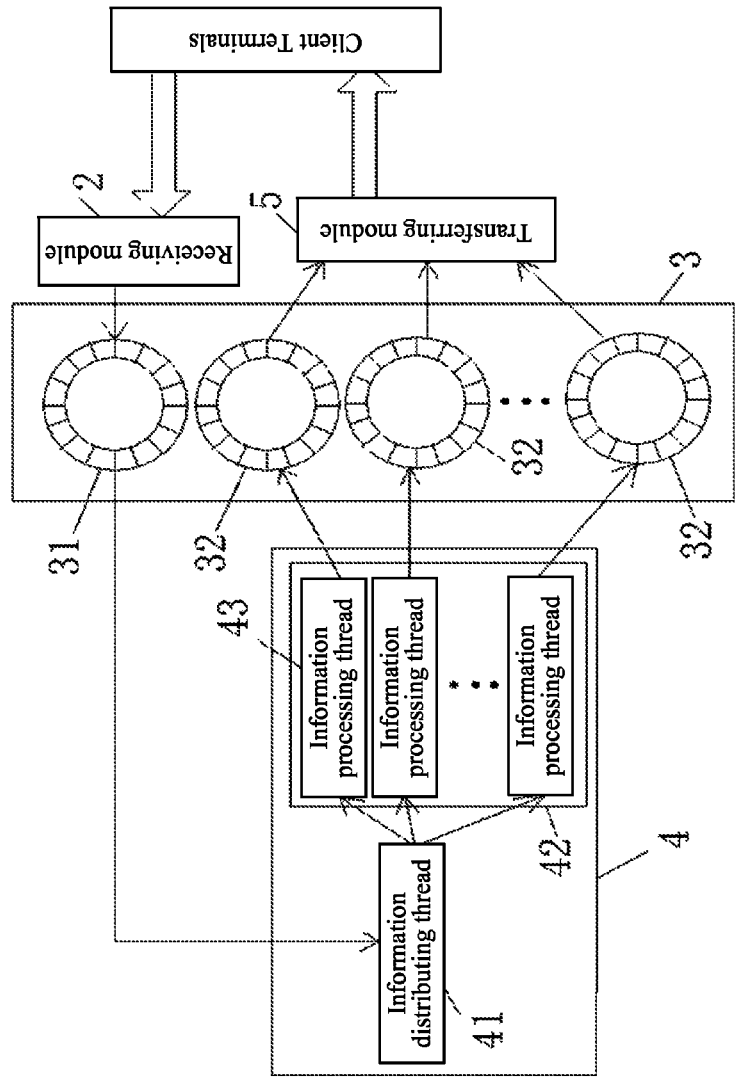
FIG. 5 is a schematic structural diagram of a distributed bus based computer system in accordance with some embodiments of the present application.

FIG. 5 is a schematic structural diagram of a distributed bus based computer system in accordance with some embodiments of the present application. As shown in FIG. 5, the server may comprise a receiving module 2, a storage module 3, a processing module 4, and a transferring module 5. FIG. 5 also shows one or more client terminals that may be connected to the server.

The receiving module 2 may be configured to receive processing request packets from one or more client terminals and enter the processing request packets into a single input information queue.

The storage module 3 may be configured to store the input information queue 31 and the output information queues 32.

The processing module 302 may be configured to: determine a number of idle information processing threads 43, select, from the front of the input information queue 31, a number of processing request packets that is equal to the number of idle information processing threads 43, and use the idle information processing threads 43 to process the selected processing request packets to obtain response data packets, wherein each information processing thread 43 is configured to use a respective output information queue 32 to store response data packets generated by the information processing thread 43. Collectively, the information processing threads 43 may be regarded as an information processing thread pool 42. Moreover, the distribution of the processing request packets may be carried out by one or more information distributing threads 41.

The transferring module 5 may be configured to transmit the response data packets within a respective output information queue 32 to a corresponding client terminal.

The receiving module 2 may comprise a connection unit configured to connect the computer system to the one or more client terminals and marking the client terminals as connected; and a communication session unit configured to establish communication sessions with the connected client terminals and marking the client terminals as in communication, wherein the computer system receives processing request packets from the one or more client terminals in communication.

In addition, the communication sessions unit may be further configured to: determine if any communication channels are idle; if any communication channels are idle, establish the active communication sessions using the idle communication channels; and if no communication channel is idle, allow the connected client terminals to queue for an idle communication channel and marking the client terminals as waiting in queue. Moreover, the communication session unit may be further configured to: switch the communication channel with the abnormally disconnected client terminal to a protected status when a client terminal in communication is disconnected abnormally.

Furthermore, the communication session unit may be further configured to: determine if any connected client terminal is associated with a communication channel having a protected status; and if a connected client terminal is associated with a communication channel having a protected status, establish the communication session with the client terminal using the communication channel. In addition, the communication session unit may be further configured to determine whether the client terminal is in an established communication session after receiving a communication request from a client terminal having a new connection, and if the client terminal is in an established communication session, terminate the association between the established communication session and an old connection and associate the new communication session with the new connection.

The server may further include: a setting module, configured to set a maximum number of connections and a maximum number of communication sessions. In addition, an address-searchable structure is generated according to the configuration in Example 2, and the client terminals may be connected to the corresponding server according to IP addresses in the configuration.

EXAMPLE 5

Figure 6:
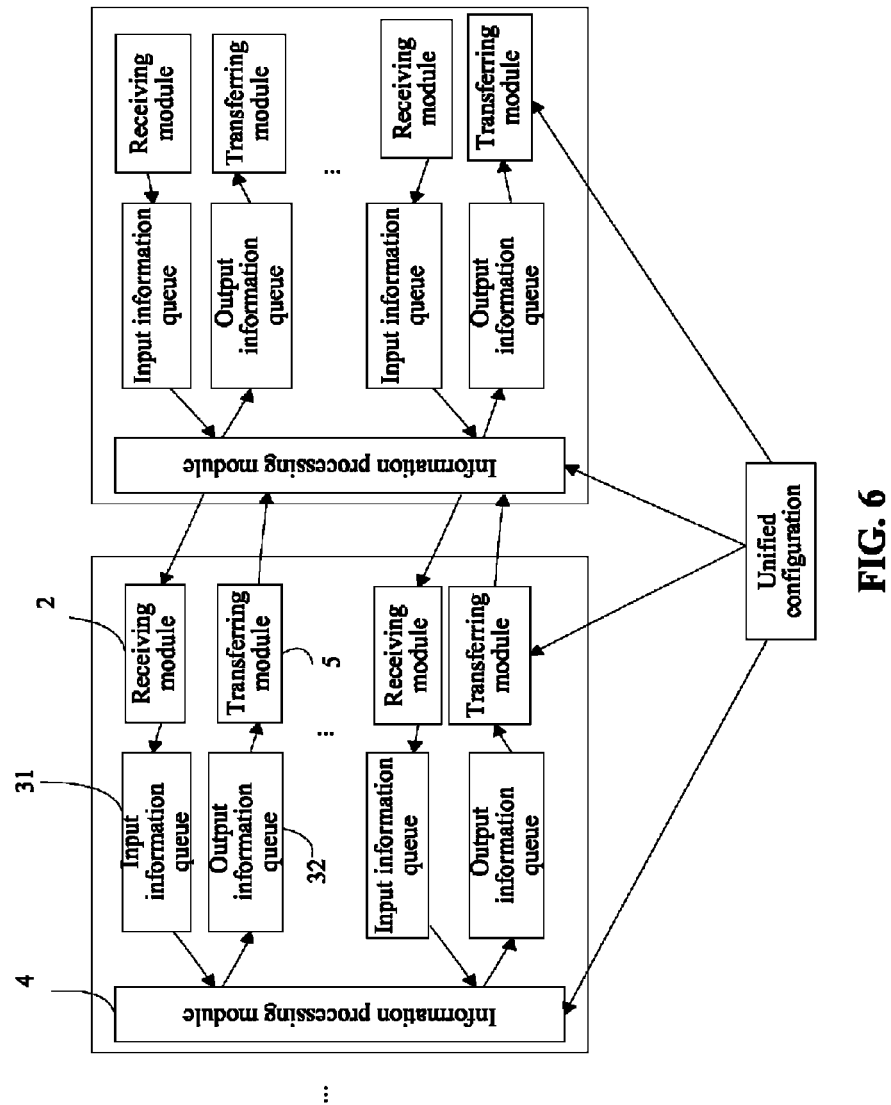
FIG. 6 is a schematic structural diagram of a distributed bus based computer system having a plurality of servers in accordance with some embodiments of the present application.

FIG. 6 is a schematic structural diagram of a distributed bus based computer system having a plurality of servers in accordance with some embodiments of the present application. As shown in FIG. 6, the bus system may include a bus and at least one server in Example 3 or 4; and the server is connected through the bus. When there are multiple servers in the system, at least one group of receiving modules 2 and transferring modules 5 are connected to an information processing module 4 of another server. For clarity purposes, not all the modules are marked.

When the information processing thread cannot process a processing request packets in a first server, the processing request packets is sent to the receiving module 2 of a second server connected thereto, and the receiving module 2 sends the processing request packets to an information processing module 4 in the second server for processing, where the transferring module 5 of the second server returns a response data packet.

Figure 7:
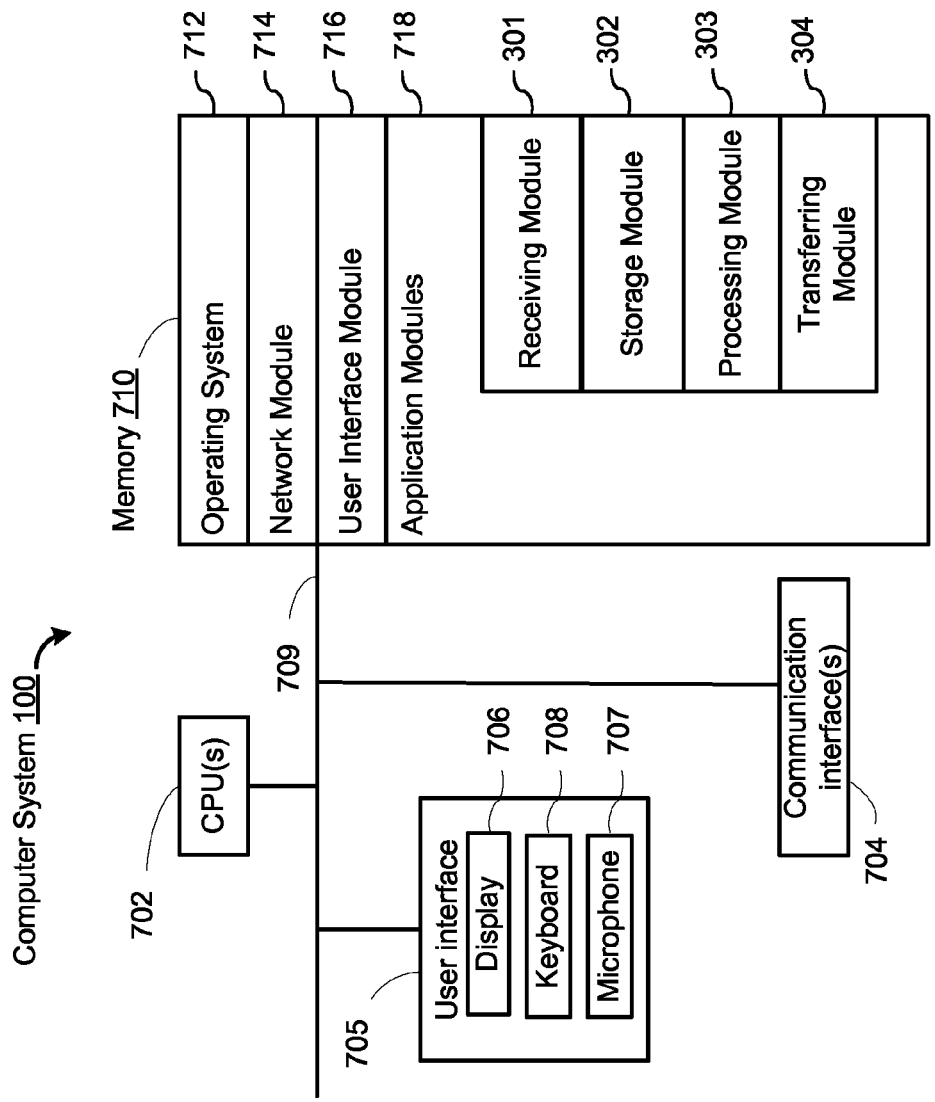
FIG. 7 is a block diagram of a computer system in accordance with some embodiments of the present application.

FIG. 7 is a block diagram of a computer system in accordance with some embodiments of the present application. The exemplary computer system 100, e.g. server, typically includes one or more processing units (CPU's) 702, one or more network or communications interfaces 704, memory 710, and one or more communication buses 709 for interconnecting these components and with other computer systems. The communication buses 709 may include circuitry (sometimes called a chipset) that interconnects and controls communications between system components. The computer system 100 may include a user interface 705, for instance, a display 706, a keyboard 708, and a microphone 707. When the computer system 100 is a smart phone or tablet, the user interface 705 may include a touch screen, which is both a display and an input device. Memory 710 may include high speed random access memory and may also include non-volatile memory, such as one or more magnetic disk storage devices. Memory 710 may include mass storage that is remotely located from the CPU's 702. In some embodiments, memory 710 stores the following programs, modules and data structures, or a subset or superset thereof:
- an operating system 712 that includes procedures for handling various basic system services and for performing hardware dependent tasks;
- a network module 714 that is used for connecting the computer system 100 to the client terminals and other computer systems via one or more communication networks (wired or wireless), such as the Internet, other wide area networks, local area networks, metropolitan area networks, and so on;
- a user interface module 716 configured to receive user inputs through the user interface 705;
- and a number of application modules 718 including the following:
- a receiving module 301 configured to receive processing request packets from one or more client terminals and enter the processing request packets into a single input information queue;
- a processing module 303 configured to: determine a number of idle information processing threads, select, from the front of the input information queue, a number of processing request packets that is equal to the number of idle information processing threads, and use the idle information processing threads to process the selected processing request packets to obtain response data packets, wherein each information processing thread is configured to use a respective output information queue to store response data packets generated by the information processing thread;
- a transferring module 304 configured to transmit the response data packets within a respective output information queue to a corresponding client terminal; and
- a storage module 302 configured to store the input information queue.

While particular embodiments are described above, it will be understood it is not intended to limit the present application to these particular embodiments. On the contrary, the present application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the present application herein is for the purpose of describing particular embodiments only and is not intended to be limiting of the present application. As used in the description of the present application and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the present application to the precise forms disclosed. Many modifications and variations are possible in view of the above teachings. The embodiments were chosen and described in order to best explain the principles of the present application and its practical applications, to thereby enable others skilled in the art to best utilize the present application and various embodiments with various modifications as are suited to the particular use contemplated.

What is claimed is:

1. A method for information processing based on distributed buses, the method comprising:
 at a server having one or more processors and memory storing programs executed by the one or more processors,
  receiving a plurality of connection requests from a plurality of client terminals respectively;

establishing connection between the server and the plurality of client terminals respectively in response to the plurality of connection requests;

establishing respective communication sessions between one or more communication channels of the server and one or more client terminals of the plurality of client terminals that are connected to the server;

receiving one or more processing request packets from the one or more client terminals that have respective communication sessions established with the server;

entering the one or more processing request packets into a single input information queue, wherein the one or more processing request packets are ranked according to time of entering of respective processing request packets;

determining a number of idle information processing threads;

selecting, from the front of the input information queue, a number of processing request packets that is equal to the number of idle information processing threads;

using the idle information processing threads to process the selected processing request packets to obtain response data packets respectively;

storing the response data packets obtained from the information processing threads in a number of output information queues respectively, wherein the number of output information queues is equal to the number of information processing threads, and wherein each information processing thread is associated with and configured to use a respective output information queue to store response data packets generated by the corresponding information processing thread; and transmitting the response data packets within a respective output information queue to a corresponding client terminal.

2. The method of claim 1, further comprising:
marking the plurality of client terminals that have established connection with the server as connected; and
marking the one or more client terminals that have established communication sessions with the server as in communication.

3. The method of claim 1, wherein the step of establishing communication sessions comprises:
determining if any communication channels are idle;
if any communication channels are idle, establishing the active communication sessions using the idle communication channels; and
if no communication channel is idle, allowing the connected client terminals to queue for an idle communication channel and marking the client terminals as waiting in queue.

4. The method of claim 3, further comprising:
when a client terminal in communication is disconnected abnormally, switching the communication channel with the abnormally disconnected client terminal to a protected status.

5. The method of claim 4, further comprising:
determining if any connected client terminal is associated with a communication channel having a protected status; and
if a connected client terminal is associated with a communication channel having a protected status, establishing the communication session with the client terminal using the communication channel.

6. The method of claim 2, further comprising:
after receiving a communication request from a client terminal having a new connection, determining whether the client terminal is in an established communication session; and
if the client terminal is in an established communication session, terminating the association between the established communication session and an old connection and associating the new communication session with the new connection.

7. The method of claim 1, wherein:
the processing request packets are based on binary data protocols.

8. The method of claim 7, wherein:
the packet headers of the processing request packets have one or more information items selected from a group consisting of a packet length, a checksum for verification, a unique identifier of a client, a command word representing a server requested by a client terminal, a sequence number of a request data packet, a header body, a connection state identifier, and a source IP address of a client terminal.

9. The method of claim 1, further comprising:
determining if the server is capable of performing a processing request included in the processing request packet; and
transferring the processing request packet if the server is not capable of performing the processing request.

10. The method of claim 1, wherein before the step of transmitting the response data packets to the one or more client terminals, the method further comprises:
extracting the response data packets from the output information queues.

11. A computer system based on distributed buses, the computer system comprising:
one or more processors;
memory; and
one or more programs stored in the memory and configured for execution by the one or more processors, the one or more programs include instructions for:
receiving a plurality of connection requests from a plurality of client terminals respectively;
establishing connection between the server and the plurality of client terminals respectively in response to the plurality of requests for connection;
establishing respective communication sessions between one or more communication channels of the server and one or more client terminals of the plurality of client terminals that are connected to the server;
receiving one or more processing request packets from the one or more client terminals that have respective communication sessions established with the server;
entering the one or more processing request packets into a single input information queue, wherein the one or more processing request packets are ranked according to time of entering of respective processing request packets;
determining a number of idle information processing threads;
selecting, from the front of the input information queue, a number of processing request packets that is equal to the number of idle information processing threads;
using the idle information processing threads to process the selected processing request packets to obtain response data packets respectively,
storing the response data packets obtained from the information processing threads in a number of output information queues respectively, wherein the number of output information queues is equal to the number of information processing threads, and wherein each information processing thread is associated with and configured to use a respective output information queue to store response data packets generated by the corresponding information processing thread; and transmitting the response data packets within a respective output information queue to a corresponding client terminal.

12. The computer system of claim 11, wherein the one or more programs further include instructions for:

marking the plurality of client terminals that have established connection with the server as connected; and marking the one or more client terminals that have established communication sessions with the server as in communication.

13. The computer system of claim 11, wherein the one or more programs further include instructions for:

determining if any communication channels are idle;

if any communication channels are idle, establishing the active communication sessions using the idle communication channels; and if no communication channel is idle, allowing the connected client terminals to queue for an idle communication channel and marking the client terminals as waiting in queue.

14. The computer system of claim 11, wherein the one or more programs further include instructions for:

determining whether the client terminal is in an established communication session after receiving a communication request from a client terminal having a new connection, and if the client terminal is in an established communication session, terminating the association between the established communication session and an old connection and associate the new communication session with the new connection.

15. The computer system of claim 11, wherein:

the processing request packets are based on binary data protocols.

16. The computer system of claim 11, wherein the one or more programs further include instructions for:

determining if the server is capable of performing a processing request included in the processing request packet; and transferring the processing request packet if the server is not capable of performing the processing request.

17. The computer system of claim 11, wherein the one or more programs further include instructions for:

extracting the response data packets from the output information queues before transmitting the response data packets to the one or more client terminals.

18. The computer system of claim 11, wherein the one or more programs further include instructions for:

storing the single input information queue and a plurality of output information queues associated with a plurality of information processing thread respectively.

19. The computer system of claim 11, wherein the one or more programs further include instructions for:

setting up a maximum connection number and a maximum communication session number, wherein:

the maximum connection number reflects the maximum number of simultaneous connections between the computer system and the client terminals, and the maximum communication session number reflects the maximum number of simultaneous communication sessions between the computer system and the client terminals.

20. A non-transitory computer readable storage medium having stored therein instructions, which, when executed by a computer system, cause the computer system to:

receive a plurality of connection requests from a plurality of client terminals respectively;

establish connection between the server and the plurality of client terminals respectively in response to the plurality of requests for connection;

establish respective communication sessions between one or more communication channels of the server and one or more client terminals of the plurality of client terminals that are connected to the server;

receive one or more processing request packets from the one or more client terminals that have respective communication sessions established with the server;

enter the one or more processing request packets into a single input information queue, wherein the one or more processing request packets are ranked according to time of entering of respective processing request packets;

determine a number of idle information processing threads;

select, from the front of the input information queue, a number of processing request packets that is equal to the number of idle information processing threads; and use the idle information processing threads to process the selected processing request packets to obtain response data packets respectively;

store the response data packets obtained from the information processing threads in a number of output information queues respectively, wherein the number of output information queues is equal to the number of information processing threads, and wherein each information processing thread is associated with and configured to use a respective output information queue to store response data packets generated by the corresponding information processing thread; and transmit the response data packets within a respective output information queue to a corresponding client terminal.

* * * * *